United States Patent [19]

Chen

[11] Patent Number: 5,283,906
[45] Date of Patent: Feb. 1, 1994

[54] NOTEBOOK COMPUTER CMOS FIRMWARE PROCESSING METHOD AND THE RELATED HARDWARE

[75] Inventor: Cheng-Wen Chen, Taipei, Taiwan
[73] Assignee: Silitek Corporation, Taipei, Taiwan
[21] Appl. No.: 780,227
[22] Filed: Oct. 22, 1991
[51] Int. Cl.$^5$ ............................................. G06F 1/32
[52] U.S. Cl. ............................ 395/750; 364/DIG. 1; 364/231.1; 364/234; 364/237.82; 364/273.1; 364/707
[58] Field of Search ............... 395/750, 275; 364/707

[56] References Cited

U.S. PATENT DOCUMENTS

| | | | |
|---|---|---|---|
| 4,698,748 | 10/1987 | Juzswik et al. | 395/750 |
| 4,758,945 | 7/1988 | Remedi | 395/750 |
| 4,809,163 | 2/1989 | Hirosawa et al. | 395/750 |
| 4,922,450 | 5/1990 | Rose et al. | 395/750 |
| 5,025,387 | 6/1991 | Frane | 395/750 |
| 5,041,964 | 8/1991 | Cole et al. | 395/425 |

*Primary Examiner*—Debra A. Chun
*Attorney, Agent, or Firm*—Lowe, Price, LeBlanc & Becker

[57] ABSTRACT

A notebook computer CMOS firmware processing method and the related hardware for saving power consumption by means of the application of the internal functions of CMOS and the processing of CMOS firmware permitting keyboard to enter idle mode or power down mode when CPU is temporarily stopped from execution, or to wake up when any key is pressed or any command is sent from the system to the keyboard.

3 Claims, 2 Drawing Sheets

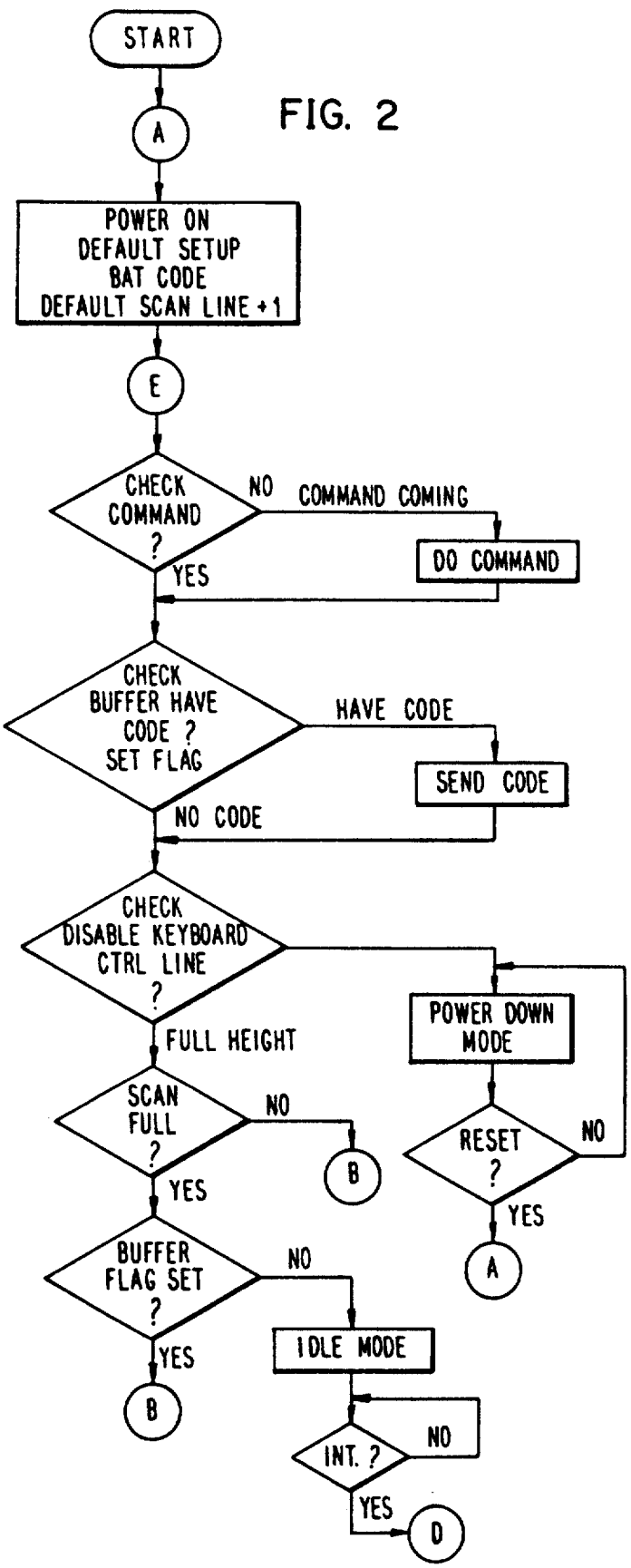

NOTEBOOK COMPUTER CMOS FIRMWARE PROCESSING METHOD AND THE RELATED HARDWARE

BACKGROUND OF THE INVENTION

Notebook computer has become more and more popular because it can be conveniently normally operated without external power supply. In order to let a notebook computer work longer with self-provided power supply, the hardware circuit of the keyboard therein must be designed with low consumption of power supply. According to conventional method CMOS (Complimentary Metaloxide Semiconductor) is commonly used to replace NMOS (N-channel Metal Oxide Semiconductor) so as to reduce the consumption of electric current. Some manufacturers may adopt QFT Type single chip packing method. However, the basic hardware structure and firmware design of a notebook computer generally remain unchanged relative to a standard computer keyboard design. The present invention not only adopts CMOS and QFP Type but also applies the functions of Idle Mode and Power Down of the CMOS used. By means of firmware processing to match with a special hardware design, keyboard and CMOS almost consume zero electric current when there is no any key code made or no any command from the mainframe (because they are kept in idle mode or power down mode). In comparing the consumption of electric current in CMOS under Idle Mode and Power Down to its normal working mode, the former is about 15% or less relative to the normal working mode. In some single chips, the consumption of electric current under Power Down may be as low as 10 µA. It has been apparent that an operator who uses a keyboard expends much time in idle condition without touching a key than in pressing keys (the so-called "idle condition" includes the dead time between each two code making actions while an user is spending time in thinking, and any dead time caused by any reasons), that is to say, idle time in much longer than execution time. The present invention is to make use of this phenomenon of the distribution of time permitting a keyboard to enter a power-saving mode during idle time, so as to reduce power consumption.

In regular single chip microcomputers, when a firmware is set to wake up from Idle Mode or Power Down, an external interrupt signal or single chip reset should be required.

The present invention will now be described by way of examples only, with reference to the annexed drawings, in which:

FIG. 2 is the single chip firmware flow chart Part-I according to the present invention; and FIG. 3 is the single chip firmware flow chart Part-II according to the present invention.

Figure 1:
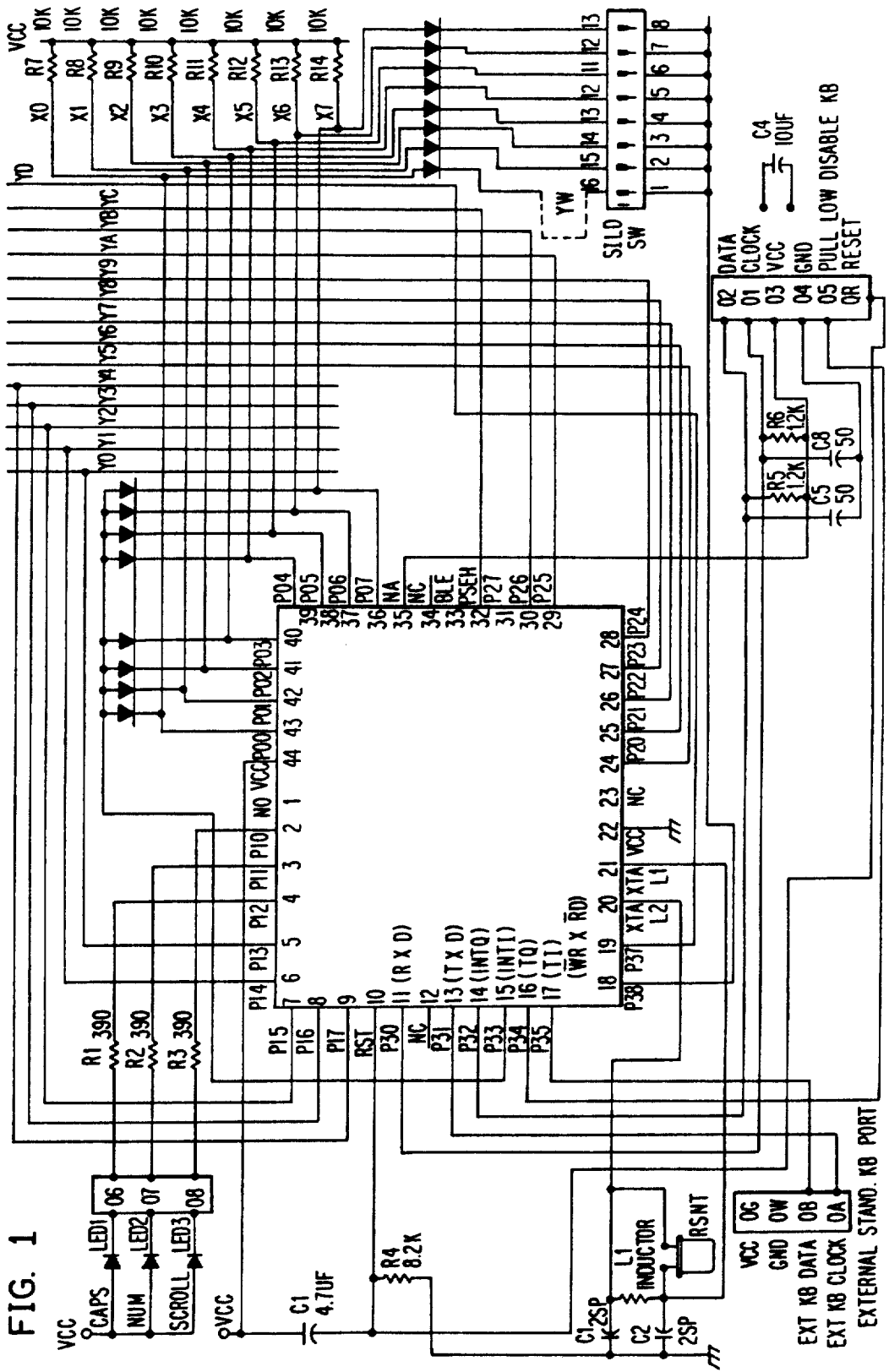
FIG. 1 is a hardware circuit diagram according to the present invention.

As illustrated in FIG. 1, the pins of X0–X7 each is connected with a diode, and therefore, there are total 8 diodes. Each diode has an opposite end connected with one another and also connected to INT1. This special hardware connecting method matches with a special firmware design to greatly save power consumption. The firmware design of the present invention is outlined hereinafter:

1. Idle Mode:

1) The scanning method for scanning each line remains unchanged as used in standard keyboard, i.e., the scanning line on the line to be scanned is pulled to Low while the others are at High. Because each row is connected to High by a 10K resistor, read-in data from each row are all High, namely, FFH.

2) The scan period is 8 lines per 4 ms, and all lines will be scanned within 8 ms, therefore, 8 ms can be called as a full scan period.

3) If there is no code after one full scan period, the firmware drives all scanning lines to Low so as to enter Idle Mode, and therefore, the consumption of electric current is reduced.

4) If any key is pressed down after a certain length of time, the voltage at the corresponding row becomes Low because the voltage at each line is Low. By means of one of the 8 diodes, voltage of Low is transmitted to INT1 causing it to interrupt, and therefore, the single chip wakes up immediately to continue program execution operation.

5) The continuous execution program drives the keyboard to start a full scan period again from the first line, namely, Y0. Before breaking a code, single chip has already scanned all the keys been pressed. When any code is scanned, the posterior program will be continuously executed to prohibit skip code, identify the key code sent by the ghost key . . . and etc., and then, the program will return to scan the next line. This procedure is repeated again and again.

6) After the scanning of each line within each full scan period, the program will skip to I/O and check if there is any code in the buffer to be sent out. A code will be sent out if any, or the program will immediately check if there is any command from the mainframe (the system) to the keyboard. If there is a command sent from the mainframe to the keyboard, the keyboard will receive such a command and then skip to scanning program, or it will return to scanning problem directly to scan the next line (before entering Idle Mode, the keyboard will completely send out all codes registered in the buffer).

7. When a full scan is passed, it enters Idle Mode. However, the mainframe may send a command to the keyboard while the keyboard enters Idle Mode. As illustrated in FIG. 1, Data is connected between the keyboard and the mainframe and also connected to INT0. When the mainframe gives a command to the keyboard, Data is turned to Low. The present invention is to utilize this phenomenon to enable the external interrupt function by means of the process of the firmware. Once an external interrupt signal is given, the single chip will immediately wake up from Idle Mode to receive the command from the mainframe.

2. Power Down:

As illustrated in FIG. 1, two additional control lines are connected to I/O for controlling the communication with the mainframe (the system), namely, a Pull Low Disable Keyboard and a Reset. These two control lines match with a special firmware design to achieve power down function. A control switch or automatic timer switch is fastened in a notebook computer mainframe. If the computer is at an idle condition for a fixed length of time, it will be detected by the computer mainframe and, the computer will be then set at Power Down Mode, i.e., through Pull Low Disable Keyboard to pull the line to Low. Under this condition, the keyboard will detect the pin at all times. If it is detected that the mainframe has been pulled to Low, the firmware will automatically set to enter Power Down Mode, so as to greatly reduce the keyboard from consuming electric current (about 10 μA) and disable the keyboard. When the operator wishes to use the computer again, the control switch on the notebook computer mainframe is pressed on and, the keyboard will immediately wake up (for mounting the control switch, the earth wire and the reset control pin are connected).

FIGS. 2 and 3 illustrate the flow chart of the firmware as designed according to the present invention. Step 20 indicates the start of the process. Step 21 indicates the default of the ICs in FIG. 1 and the scanning of all lines at 8 ms as a full scan period. Step 22 is to detect if there is any command from the mainframe to the keyboard. If a command from the mainframe to the keyboard is detected, do the command 23 and then return to scanning program, or skip to step 24 to check if any code to be sent from the buffer. If there is any code to be sent from the buffer, do the job, or return to scanning program to scan the next line, Step 26 is to check the status of every key after one full scan period, so as to enter Power Down Mode if Pull Low Disable Keyboard is pulled to Low, or to continue Step 28 if it is pulled to High. When enters Step 28, it is to check if scanning job has been completed. If scanning operation is completed, it immediately enters Step 30, or it will return to scanning program. When enters Step 30, it is to check if there is any code to be sent out from the buffer. If there is a code to be sent out from the buffer, the code is sent out immediate and then, the keyboard will return to scanning program. If there is no any code to be sent out from the buffer, it immediately enters Step 31 of Idle Mode. Step 32 indicates that the single chip wakes up immediately if there is any key been pressed or any command from the mainframe been given to the keyboard. Step 29 indicates that the program will return to Step 21 if the Reset key is pressed during Power Down Mode. Step 33 is the code sending program code. If there is any code detected, it will immediately skip to Step 34 so as to send out the code, or it will skip to Step 35 so as to scan next line.

As indicated, the present invention provides an improved, simple hardware circuit and a keyboard firmware processing technique which enable a keyboard to self-check its current status so as to save power consumption by pulling all scanning lines to Low when keyboard is under idle condition.

What is claimed is:

1. A method of operating a combination of (i) a computer having a buffer and a reset button and (ii) an associated keyboard having a plurality of keys and scannable key sensing lines to selectively reduce power consumption of the combination by automatically selectively entering one of an idle mode and a power-down mode of operation, said method comprising the steps of:

scanning the key sensing lines of the keyboard in sequence one after another to completely scan the key sensing lines within one full scan period detecting a command supplied by the computer to the keyboard and, in response, executing the command and then returning to the scanning step;

checking the buffer to detect a code to be sent and, in response to detecting a command to be sent from the computer to the keyboard, sending the code to the computer and then returning to the scanning step, and, in response to detecting no code to be sent from the buffer to the computer, scanning a next line of the key sensing lines;

checking to detect if all codes stored in the buffer have been sent out after one scan period and, in response, operating said keyboard in an idle mode of operation wherein said scanning step is not performed;

detecting an activation of a key of said keyboard and, in response, supplying an interrupt signal for operating said keyboard in an active mode wherein said scanning step is performed;

enabling an interrupt of the keyboard with the keyboard operated in said idle mode wherein said keyboard is responsive to a command to the keyboard received from the computer for changing a mode of operation from said idle mode to said active mode for performing said scanning step;

detecting a disable signal from the keyboard to the computer after one scan period so as to operate said computer in a power down mode of operation; and detecting an operation of the reset button and, in response, operating the keyboard in the active mode of operation wherein said scanning step is performed.

2. A computer system having automatic power reduction modes of operation, comprising:

a processor selectively operable in a normal operating mode and a power down mode of operation;

a keyboard including a plurality of keys and a plurality of key sensing lines, said keyboard including scanning means responsive to an activation of said keys for selectively scanning said key sensing lines to provide a code signal to said processor;

means for detecting completion of a scan cycle of all of said key sensing lines by said scanning means and, in response, one of supplying said code signal to said processor and an idle mode when no keyboard inputs are detected by said plurality of key sensing means;

means for detecting an operation of said processor in said power down mode of operation and, in response, inhibiting an operation of said completion detecting means such that said keyboard goes into said power down mode; and reset means for operating said processor in said normal mode of operation and for initiating scanning of said key sensing lines of said keyboard by said scanning means.

3. The computer system according to claim 2 wherein said keyboard includes timer means responsive to a command signal from said processor and to said scanning means for selectively inhibiting scanning of said key sensing lines by said scanning means.

* * * * *